United States Patent
Partridge

[11] Patent Number: 6,164,622
[45] Date of Patent: Dec. 26, 2000

[54] COMPACT EXPANDING GATE VALVE

[75] Inventor: Charles C. Partridge, Hou., Tex.

[73] Assignee: Daniel Valve Company, Inc., Houston, Tex.

[21] Appl. No.: 09/425,831

[22] Filed: Oct. 22, 1999

[51] Int. Cl.[7] .................................................. F16K 25/00
[52] U.S. Cl. ............................................................ 251/167
[58] Field of Search .................................. 251/167, 169, 251/326, 327, 328

[56] References Cited

U.S. PATENT DOCUMENTS

| | | | |
|---|---|---|---|
| 983,960 | 2/1911 | Watson | 251/167 |
| 2,210,189 | 8/1940 | Sorensen | 251/167 |
| 2,502,689 | 4/1950 | Yant | 251/167 |
| 2,676,780 | 4/1954 | Wheatley . | |
| 2,749,083 | 6/1956 | Fennema et al. | 251/167 |
| 3,003,742 | 10/1961 | Kearns . | |
| 3,051,434 | 8/1962 | Gulick | 251/167 |
| 3,586,034 | 6/1971 | Karzeniowski . | |
| 4,188,014 | 2/1980 | Alvarez . | |
| 4,189,127 | 2/1980 | Constantino . | |
| 4,279,404 | 7/1981 | Levin . | |
| 4,779,649 | 10/1988 | Balter . | |
| 5,722,636 | 3/1998 | Houston . | |

Primary Examiner—Kevin Shaver
Assistant Examiner—David A. Bonderer
Attorney, Agent, or Firm—Conley, Rose & Tayon, P.C.

[57] ABSTRACT

A compact expanding gate valve having a valve body defining a flowway and having spaced internal seat rings. Guide elements project internally from the valve body. A valve stem driven gate and segment assembly is movable within the valve body between open and closed positions relative to the seat rings and has control arms mounted by actuating pins to each side of gate and segment members of the gate and segment assembly. The control arms are movable linearly with the gate and segment assembly and are disposed in guided relation with the guide elements during opening and closing movement. During initial movement of the gate and segment assembly from the closed position, the pinned connection of the control arms to the gate member and the segment member causes the control arms to pivot responsive to relative linear movement of the gate and segment members and apply collapsing force to the gate and segment members to collapse the gate and segment assembly to minimize frictional contact thereof with the seat rings and permit its movement by the valve stem from the closed position to the open position.

18 Claims, 4 Drawing Sheets

COMPACT EXPANDING GATE VALVE

BACKGROUND OF THE INVENTION

1. Field of the Invention

The present invention is directed generally to gate valves for pipe lines and the like and more specifically to expanding gate valves with relatively movable gate and segment assemblies having oppositely inclined interacting cam surfaces that cause expansion thereof for tight sealing with internal sealing surfaces with the gate valve and permit contraction thereof to permit opening and closing movement of the gate and segment assemblies by a linearly movable valve stem. Even more specifically, the present invention concerns a compact expanding gate valve mechanism having a gate and segment assembly incorporating control arms which are connected to the gate and segment actuating pins for achieving desired positioning of the gate and segment at various positions during opening and closing movement of the valve mechanism.

2. Description of the Prior Art

Expanding gate valves have been in wide use for many years and achieve efficient sealing particularly at both the open and closed positions of the valve mechanism. Typically, within a valve body structure a gate member is movable by a linearly movable valve stem between an open position, where flow of fluid through inlet and outlet passages is permitted, and a closed position where the gate member blocks the flow of fluid through the inlet and outlet passages. The gate member may define a flow port which is in registry with the flow passages in the open position of the gate and segment assembly. In compact gate valves, the gate member is often non-ported and is moved by the actuating stem of the valve to an open position where it is retracted to a position within the bonnet structure of the valve body and substantially clear of the flow passages.

Efficient sealing of the gate and segment assembly with respect to internal seat rings or seat surfaces located within the valve body about the flow passages is caused by one or more segment members which cooperate with the gate member to define a gate and segment assembly and which is positionable relative to the gate member to permit contraction of the gate and segment assembly to thus permit its movement between the open and closed positions of the valve mechanism. This expansion and contraction of the gate and segment assembly is caused by interacting wedge or cam surfaces of the gate member and the segment member is caused by interacting cam or wedge surfaces of the gate and segment members which typically occurs as the gate member is driven linearly by the valve stem while the segment member is restrained by suitable internal stop structure of the valve body.

A problem that typically occurs when expanding gate valves are employed is the tendency of the gate and segment assembly to remain in its condition of expansion even when force is being applied by the valve stem to achieve its contraction and movement. To minimize the tendency of the gate and segment assembly to remain so expanded, springs are often used to provide an urging force for collapsing or contracting the gate and segment assembly in absence of the presence of cam induced forces that overcome the spring force and expand the gate and segment assembly or structure that prevents collapse of the gate and segment assembly and maintains it positioned at its open or closed positions.

Another problem that often occurs is the tendency of conventional gate and segment assemblies to undergo a condition known as "back-wedging" wherein the gate and segment assembly will be expanded particularly during its movement toward the closed position responsive to pressure induced force. As the gate and segment assembly are moved typically downwardly toward the closed position, as the flow path through the valve becomes restricted the velocity of the flowing fluid will increase. This increased velocity flow will act on the segment member, forcing it tightly against the downstream seat and thus increasing its drag or frictional resistance to movement. When this condition is developed the gate member is physically moved by the valve stem while the segment tends to become static at an intermediate position. This condition results in relative movement of the gate and segment members, thus causing expansion of the gate and segment assembly during its travel between the open and closed positions.

Resistance to opening and closing movement of the gate and segment assembly can also result from increased pressure within the valve chamber as compared to pressure within the flowway of the valve. This higher body pressure can develop as the result of temperature changes, such as when fluid trapped within the valve body externally of the seat rings can expand as the result of increased heat and cause body pressure of increase. This increased body pressure can act on the gate and segment assembly and enhance its frictional engagement with the valve seats to the point that opening movement of the gate and segment assembly requires excessive valve stem force. It is desirable therefore to ensure that the gate and segment assembly does not become expanded by back-wedging during its movement between the open and closed positions. It is also desirable that the gate and segment assembly become collapsed immediately as its movement toward the open or closed position is initiated and remain collapsed during the entirety of its travel between the open and closed positions.

SUMMARY OF THE INVENTION

It is a principal feature of the present invention to provide a novel expanding gate valve mechanism having a gate and segment assembly incorporating a mechanism for ensuring movement of the gate and segment assembly thereof to its collapsed condition to enable stem actuated movement of the gate and segment assembly thereof from the closed position to the open position;

It is another feature of the present invention to provide a novel expanding gate valve mechanism having a gate and segment assembly which is physically maintained at the collapsed condition thereof during the entirety of its movement between the open and closed positions, to ensure that a condition of back-wedging will not occur;

It is an even further feature of the present invention to provide a novel expanding gate valve mechanism having a gate and segment assembly and incorporating a pair of control arms interacting with control pins, projecting from the gate and segment members, which mechanically actuate the gate and segment assembly from the expanded condition thereof to the collapsed condition to thereby permit its stem actuated opening movement within the valve body;

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is a sectional view of a compact expanding gate valve mechanism constructed in accordance with the principles of the present invention and representing the preferred embodiment of the invention and further showing the valve mechanism in the closed condition thereof;

FIG. 2 is a sectional view of the compact expanding gate valve mechanism of FIG. 1 and showing the gate and segment assembly of the valve mechanism at the open condition thereof, with the gate and segment assembly retracted within the bonnet chamber of the valve;

FIG. 3 is a partial sectional view of the compact expanding gate valve of FIGS. 1 and 2, shown enlarged for greater detail and further showing the closed and expanded position of the gate and segment assembly and also showing one of the control arms of the gate and segment assembly positioned with the guide slot thereof disposed in angulated relation with the guide pins of the valve body;

Figure 1:
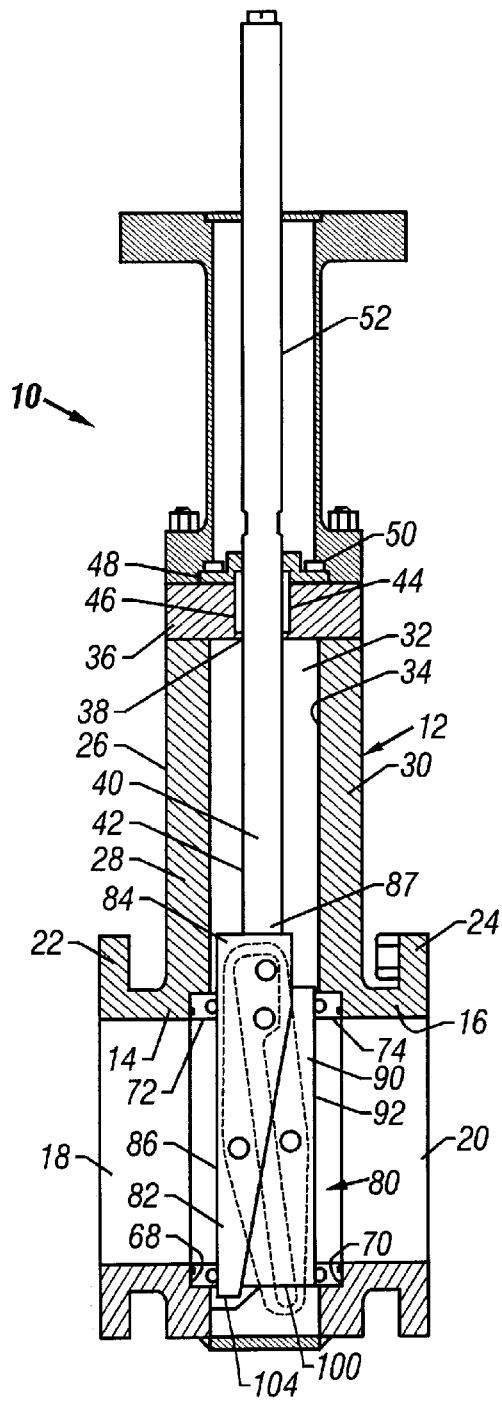
Figure 2:
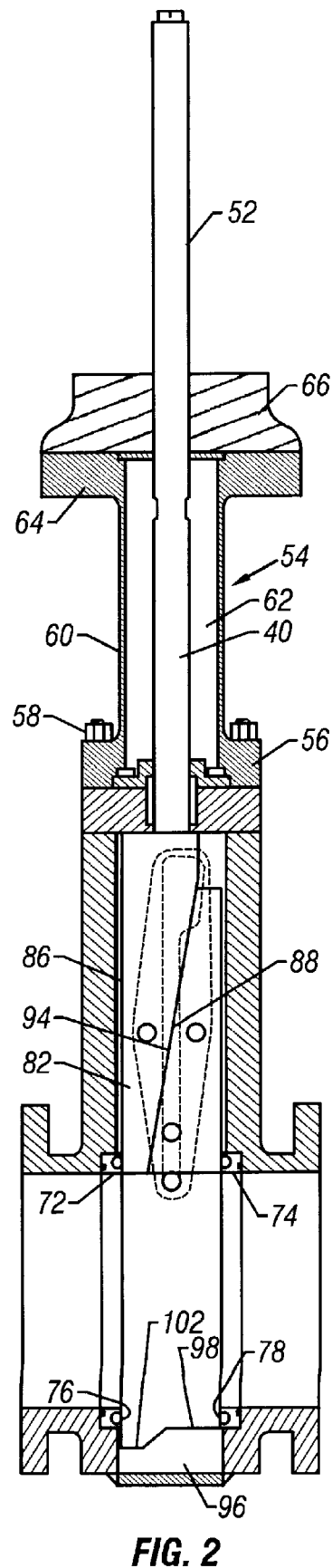
Figure 4:
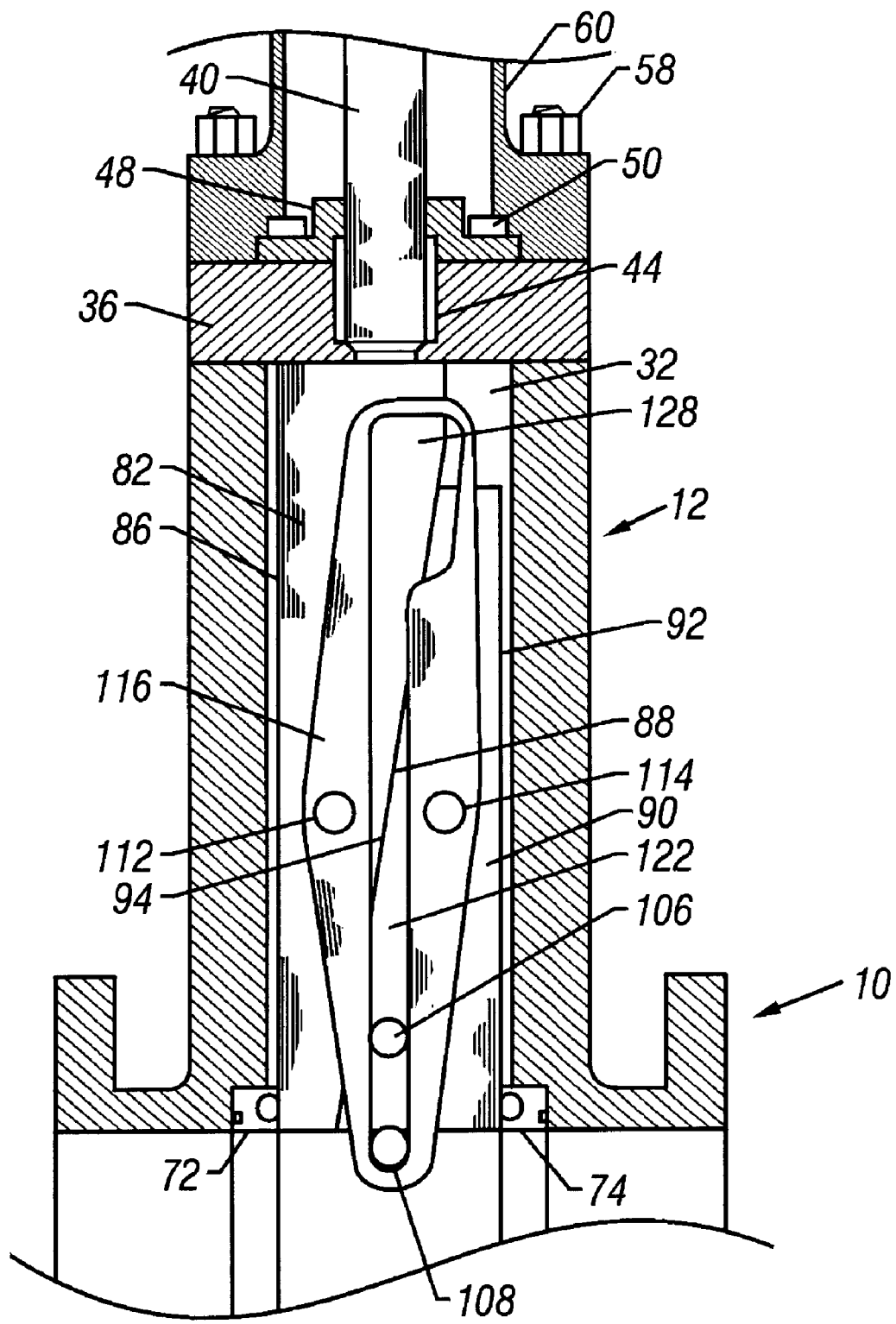
Figure 5:
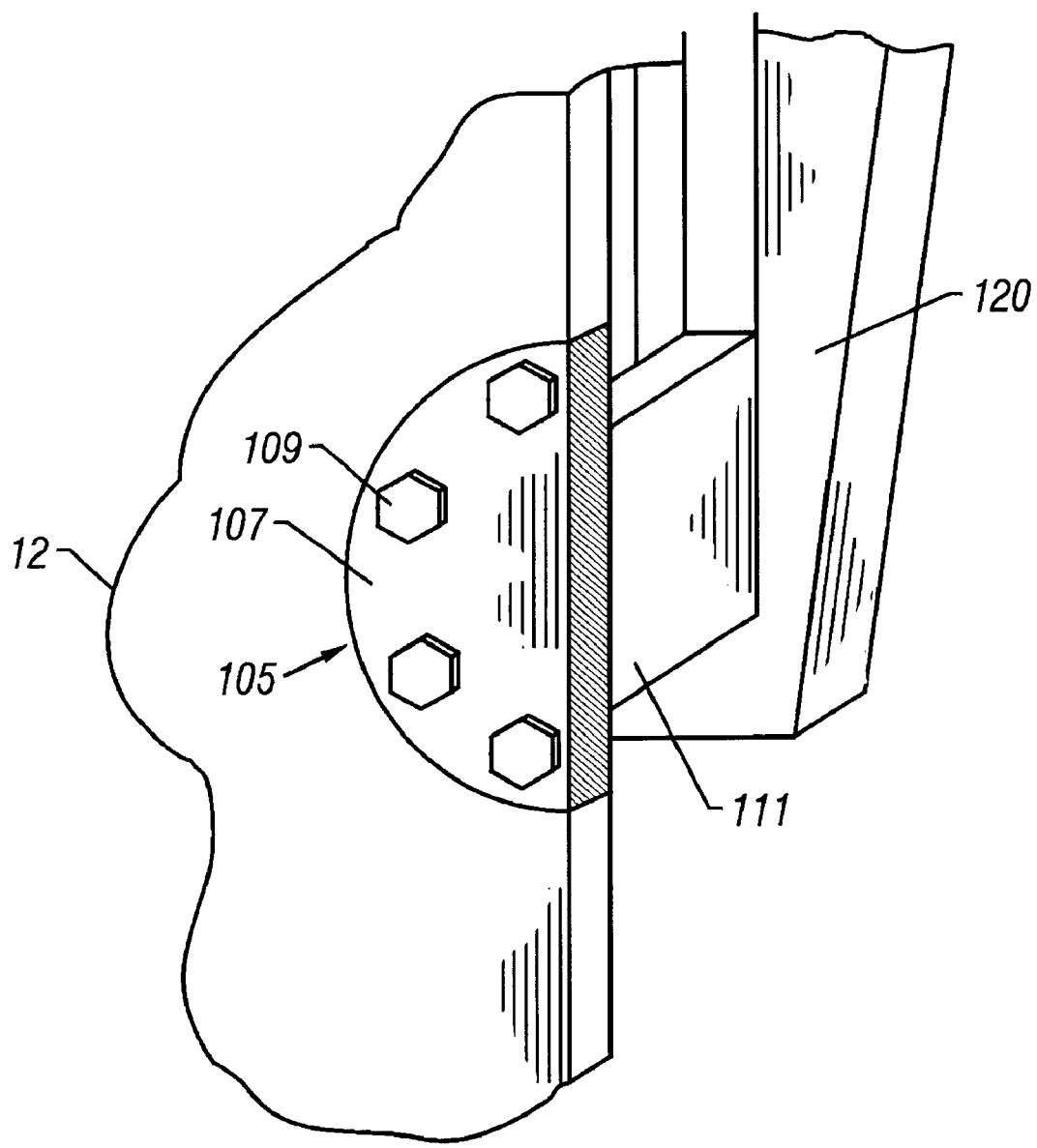

FIG. 4 is also a partial sectional view of the compact expanding gate valve of FIGS. 1 and 2, shown enlarged for greater detail and showing the open position of the gate and segment assembly, with the gate and segment assembly retracted within the bonnet chamber of the valve and with one of the segment positioning control arms shown with the elongate guide slot thereof aligned with and receiving the guide pins of the valve body; and FIG. 5 is a fragmentary isometric illustration with parts thereof broken away and shown in section and showing a control arm guide structure representing another embodiment of the present invention.

DETAILED DESCRIPTION OF PREFERRED EMBODIMENT

Referring now to the drawings and first to FIGS. 1 and 2, a compact expanding gate valve embodying the principles of the present invention is shown generally at 10 and is provided with a valve body shown generally at 12 and defining conduit sections 14 and 16 which form flow passages 18 and 20 through which fluid is permitted to flow when the valve mechanism is at its open position as shown in FIG. 2. The conduit sections 14 and 16 each define connection flanges 22 and 24 respectively which permit bolted connection of the valve body to a pipeline, not shown, having flanged pipe sections. It should be borne in mind that the valve body may be provided with any other suitable type of pipe connection system, such as weld connections, clamped connections, or the like, without departing from the spirit and scope of the present invention.

The valve body 12 defines a bonnet section 26 having bonnet wall members 28 and 30 that are disposed in spaced relation and defined in internal bonnet chamber 32. Typically the valve body will be of welded construction and formed of plate material though it may be constructed in any other suitable manner within the spirit and scope of the present invention. For example, the bonnet section may be cast or otherwise formed and may be of circular or oval cross-sectional configuration, if desired. When composed of plate material, the bonnet wall members 28 and 30 will be composed of flat plate stock and side-wall members, one being shown at 34 will be welded or otherwise connected to the bonnet walls 28 and 30. A bonnet closure 36 will be connected to the bonnet walls 28 and 30 and to the side-wall members 34 in any suitable manner. Typically, to permit repair or replacement of the gate and segment assembly or the seat rings, the bonnet closure 36 will be removably connected in sealed assembly with the bonnet walls by bolting or by any other suitable means of connection.

The bonnet closure member 36 defines a centrally located typically circular valve stem opening 38 through which a valve stem 40 extends. The lower portion of the valve stem 40 defines a cylindrical sealing surface 42 which is engaged by a packing 44 which is contained within a packing gland 46 that is defined, at least partially, within the bonnet closure member 36. To permit the packing or packing assembly to be installed within the packing gland and for periodic replacement of the packing, typically a portion of the packing chamber 46 is defined by a packing retainer element 48 that is secured to the bonnet closure structure 36 by means of bolts 50 or by any other suitable means.

The upper portion of 52 of the valve stem 40 is typically an externally threaded section which is engaged by the internally threaded section of a valve actuator drive nut, not shown. As the drive nut is rotated by the rotary valve actuator for opening and closing movement of the valve mechanism, its threaded interaction with the threaded section 52 of the valve stem 40 will impart linear movement to the valve stem from the open position thereof shown in FIG. 1 to the closed position shown in FIG. 2. It should also be borne in mind that the valve stem 40 may be actuated between its open and closed positions by means of a linear actuator such as a hydraulic or pneumatic cylinder actuator if desired.

The upper portion of the valve body is defined by a yoke tube shown generally at 54 which has a lower connection flange 56 having a plurality of holes through which project bolts or stud and nut assemblies 58 which mount the yoke tube securely to the upper surface of the bonnet closure 36. Typically the connection flange, at its interface with the bonnet closure 36, will be provided with a suitable sealing system which, for purposes of simplicity, is not shown. A yoke tube member 60 extends upwardly from the connection flange 56 of the yoke tube structure and defines an internal chamber 62 which is substantially closed and defines a protective chamber for the valve stem 52. At the upper portion of the yoke tube element 60 is provided an actuator mounting flange 64 which may be welded or otherwise connected to the yoke tube 60. The mounting flange 64 provides support for a valve actuator 66 which may be a rotary actuator imparting driving rotation to a drive nut having threaded engagement with the upper threaded section 52 of the valve stem 40. Alternatively, as indicated above, the valve actuator 66 may conveniently take the form of a linear actuator such as a hydraulic or pneumatic cylinder motor for accomplishing linear movement of the valve stem for opening and closing movement of the valve mechanism. Typically, for protection of the upper threaded extremity 52 of the valve stem the valve actuator 66 will be provided with a stem protector which typically is a tubular element within which the upper end of the valve stem is movably received. This stem protector simply prevents the upper threaded section of the valve stem from being contaminated or fouled by dirt, dust, water and other debris.

The valve body is defined internally to form a pair of circular seat recesses 68 and 70 within which are located circular seat elements or seat assemblies 72 and 74. Typically, the circular seat elements 72 and 74 will be provided with face sealing elements 76 and 78 which enhance sealing of the seat rings with respect to a gate and segment assembly shown generally at 80. The gate and segment assembly incorporates a gate member 82 having its upper end 84 connected to the lower end 86 of the valve stem 40 so that the gate member is moved directly by the valve stem as the valve stem is linearly cycled during opening and closing movement of the valve mechanism. The gate member 82 defines a planar sealing surface 86 which is disposed for sealing engagement with the circular sealing face and the face seal 76 of the circular seat ring 72 when the gate member is at its closed position as shown in FIG. 1. The gate member 82 also defines an inclined cam surface 88 which faces toward a segment member 90 which is also disposed for reciprocating movement within the valve body along with the gate member 82. The segment member 90 likewise incorporates a planar sealing surface 92 which is disposed for sealing engagement with the circular seat 74 of the valve mechanism. The segment 90 further defines a corresponding inclined cam surface 94 which is disposed in face-to-face engagement with the inclined cam surface 88 of the gate member 82. Interaction of cam surfaces 88 and 94 as the gate member 82 is moved linearly relative to the segment member, causes the segment member to also be moved laterally, thus expanding the gate and segment assembly and developing tight sealing engagement of the respective sealing surfaces 86 and 92 of the gate and segment with the circular sealing face surfaces of the respective seat rings 72 and 74. To cause relative movement of the gate member 82 with respect to the segment member 90, when the gate member reaches its closed position, an intermediate stop member 96 of the valve body is formed to define a stop surface 98. The stop surface 98 is positioned for engagement by the lower end surface 100 of the segment 90 as the gate and segment assembly are moved downwardly to the closed position within the valve body. This feature permits the gate and segment assembly to remain collapsed during its movement to the closed position so that its movement can be accomplished without requiring valve stem force beyond the operating limits of the valve actuator mechanism. The intermediate valve body member 96 also defines a recess 102 which permits the lower end 104 of the gate member 82 to move further downwardly after the segment member 90 has been moved into engagement with the internal stop surface 98. As the gate member is moved downwardly relative to the segment member, after the segment has engaged the stop surface, the inclined flat cam surfaces 88 and 94 are caused to interact to impart lateral movement to the segment member, thereby expanding the gate and segment assembly and mechanically forcing the planar sealing surfaces 86 and 92 of the gate and segment into tight sealing relation with the respective seat rings 72 and 74.

When the valve mechanism is in its closed condition as shown in FIG. 1 with the planar sealing surfaces of the gate and segment in tight sealing engagement with the seat rings, opening movement of the valve mechanism is accomplished by moving the valve stem member 40 upwardly by means of the valve actuator 66 to thereby impart upward movement to the gate member 82. When this occurs the segment member is permitted to move laterally toward the gate member by virtue of relative movement of the inclined cam surfaces 88 and 94. If however the fluid being controlled by the valve mechanism is under considerable pressure, this pressure will act across the segment member by virtue of its sealing engagement with the seat ring and can cause the planar sealing surface 92 of the segment member to be frictionally restrained by the downstream seat ring 74. This frictional resistance to gate and segment movement can be greater than the valve stem is designed to bear. In this circumstance, the connection of the valve stem with the gate member can yield, thereby permitting the valve stem to separate from the gate member. Under this circumstance, it will be necessary to shut down the pipeline and repair or replace the valve. To accomplish repair of the valve while it is located within the pipeline, it will typically be necessary that the bonnet closure member 36 be removable, i.e. connected by bolts or other suitable means to the valve body, so that the gate and segment members can be removed from the valve body and replaced. It is therefore desirable to provide means for mechanically moving the segment member toward its collapsed position relative to the gate member as opening movement of the gate and segment assembly is initiated. Ordinarily springs are provided for this purpose, but it has been found quite clear that the available spring force is usually not sufficiently great to overcome the friction of the gate and segment assembly with the seat rings. It is thus desirable to provide a mechanism for physically accomplishing collapse of the gate and segment assembly to thus permit its opening or closing movement without necessitating application of excessive valve stem force.

Figure 3:
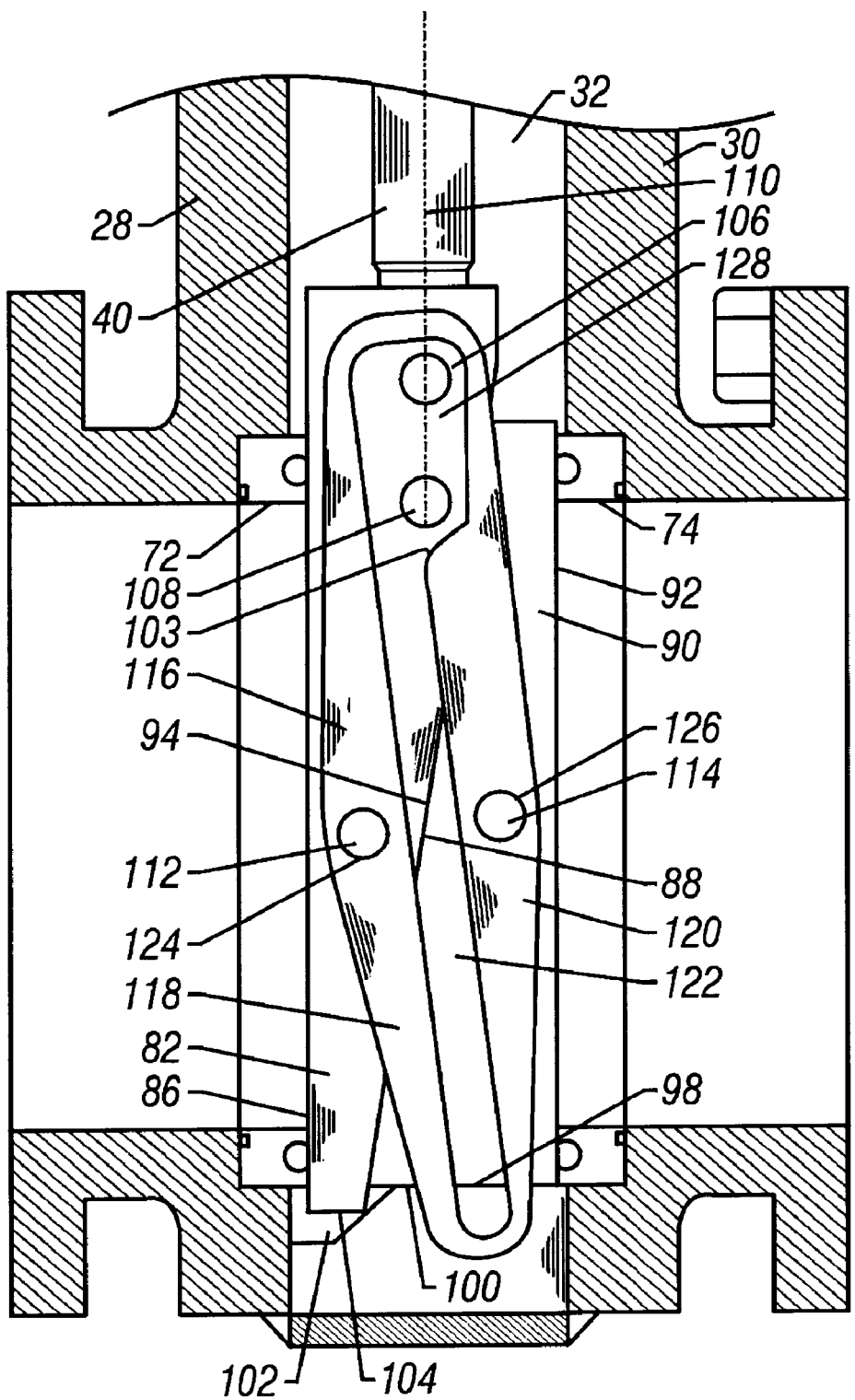

To accomplish this feature, as shown in greater detail in FIGS. 3 and 4, the valve body is provided with internal guide structure which may conveniently take the form of guide pins 106 and 108 which project from each side of the valve body and which are substantially oriented in aligned relation with an imaginary plane 110 which also intersects the center-line of the valve stem 40. If desired the internal guide structure may take the form of elongate internal guide elements which may be fixed to the wall structure of the valve body or may be formed as an integral part of the valve body structure For example, as shown in FIG. 5, a guide structure shown generally at 105 defines a connection plate section 107 which is secured to the valve body by bolts 109 or by any other suitable means to maintain the guide structure in fixed relation with the valve body. From the connection plate projects a rib-like guide element 111 which is received within the guide slot of a respective control arm of the valve mechanism, which is discussed in detail hereinbelow, and which serves to guide the control arms during transition of the gate and segment assembly between its open and closed positions. The length of the rib-like guide element 111 may be substantially the same as the dimension of the oppositely facing outside surfaces of the guide pins 106 and 108. The gate member 82 is provided with segment actuator pins 112 that project laterally from each of its sides. Likewise, the segment member 90 is provided with a pair of segment actuator pins 114 that project laterally from each side thereof. At least one and preferably a pair of control elements or arms 116 are provided which are located at opposite sides of the gate and segment assembly for movement therewith as the gate and segment assembly are moved between the open and closed positions thereof The control arms 116 may be of any suitable configuration establishing guided engagement with the guide elements 106 and 108 or other internal guide structure of the valve body. The control arms are connected in engagement with the gate member and segment member by respective segment actuating pins 112 and 114 of the gate member 82 and the segment member 90. The control arms each define arm sections 118 and 120 that are disposed in spaced relation and defined an elongate guide slot 122. The guide slot 122 is provided to receive the aligned guide pins 106 and 108 as shown in FIGS. 1–4, the rib-like guide structure 111 of FIG. 5 or any other suitable internal guide structure of the valve body, to control orientation of the control arms as the gate and segment assembly traverses its movement from the closed position shown in FIG. 1 to the open position shown in FIG. 2. Although the control arms are shown to define a guide slot extending substantially the length thereof, it should be borne in mind that guiding geometry other than slots may be employed to establish a guiding relationship between the control arms and the valve body without departing from the spirit and scope of the present invention. The arm sections 118 and 120 of the control arms 116 each define pin receiving openings 124 and 126 that are of slightly oval configuration so as to permit lateral movement of the control arms relative to each of the segment actuating pins 112 and 114 to thus permit slight rotational movement or canting of the control arms responsive to final closing or initial opening of the gate and segment assembly. This arrangement also permits the degree of lateral movement of the segment relative to the gate member which occurs during expansion and contraction movement of the gate and segment assembly. At the upper portion of the segment actuating arms, the guide or control slot of each of the control arms is provided with an enlargement 128 which permits slight rotation or canting of the control arms about the segment pivot 114 to the inclined or canted control arm position shown in FIG. 3. The slot enlargement 128 is of a configuration to permit control arm pivoting by the segment actuating pins 112 of the gate member with pivotal movement occurring about the segment actuating pins 114 which occurs as the result of movement of the gate member relative to the segment member after the lower end of the segment member has moved into contact with the stop surface 98 of the stop member of the valve body.

The opposite control arm activity occurs as the gate member 82 is moved openly by the valve stem 40 in the manner described above. As the gate member is moved upwardly, the inclined cam surface 88 of the gate member will move away from the inclined cam surface 94 of the segment member 90. As mentioned above, pressure differential acting across the segment member may develop sufficient frictional resistance with the seat ring 74 that it will tend to remain firmly seated against the seat ring. This frictional resistance may be sufficiently great so as to prevent movement of the segment member to its collapsed position relative to the gate member, so that the gate and segment assembly will remain expanded and in tight engagement with each of the seat rings 72 and 74. In this condition, when a conventional expanding gate mechanism is employed, the segment can be prevented from being moved along with the gate member so that the result is damage to or excessive wear of the valve actuator or cause the connection of the valve stem with the gate member to yield. When this condition occurs, the valve stem can separate from the gate member and the valve mechanism will be rendered inoperative. Even when a conventional expanding gate mechanism is movable under these conditions, moving the gate and segment assembly with the planar sealing surfaces 86 and 92 of the gate and segment in tight frictional engagement with the respective sealing faces of the seat rings 72 and 74 can cause significant erosion or galling of the sealing surfaces of the gate and or segment members to damage the valve and require replacement or repair of the gate and segment assembly.

It is important to note that the control arms are actuatable during initial opening or closing movement to a collapsed condition and maintain the gate and segment assembly collapsed at all conditions of pressure. During movement of the gate and segment assembly between the open and closed positions the control arms maintain the gate and segment assembly collapsed and thus eliminate development of a condition of back-wedging. In order to forcibly actuate the gate and segment assembly to cause sufficient collapse thereof to permit linear movement thereof from the open position shown in FIGS. 1 and 3 to the closed position shown in FIGS. 2 and 4 a gate and segment control mechanism is provided for mechanically collapsing the gate and segment assembly responsive to opening actuation of the valve mechanism. As the gate member 82 is moved upwardly by the valve stem 40 from the position shown in FIGS. 1 and 3, the segment actuating pin 112 will also move upwardly and will act against a surface of the oval pin opening 124 thereby imparting upward force to the control arm section 118 causing it to be pivoted about the segment actuating pin 114 of the segment. The segment actuating control arms will both be pivoted in like manner causing clockwise rotation of the control arm from the position shown in FIG. 3 about the segment actuating pin 114 to the position shown in FIG. 4, at which position the elongate guide slot 122 of the respective gate and segment control arm will become aligned with the respective guide pins 106 and 108 of the valve body. During rotation of the control arms by the actuating pins 112 of the gate member 82, the gate member will be caused to move linearly relative to the gate member and the control arms will apply collapsing force to the segment member to minimize its lateral dimension and permit linear movement of the gate and segment assembly to the open position shown in FIG. 4. After this rotational movement of the control arms has occurred, the control arms 116 will each be in the position shown in FIG. 4, with the elongate guide slot 122 being aligned with the fixed guide pins 106 and 108 of the valve body. As the gate and segment assembly is retracted into the bonnet chamber 32 the control arms 116 will be moved upwardly along with the gate and segment assembly, causing the fixed guide pins of the valve body to traverse the length of the elongate slots 122 thereof as is evident from FIG. 4. During such movement the gate and segment assembly the segment will be prevented from movement relative to the gate member and the gate and segment assembly will consequently be prevented from expansion until the end of its linear travel has been reached.

Closing movement of the gate and segment assembly is generally the opposite of the opening movement discussed above. The valve actuator will move the valve stem 40 downwardly and the valve stem will in turn move the gate member downwardly. The control arms 116 will be moved downwardly along with the gate member 82 by virtue of its connection therewith by the segment actuating pin 112. As the gate and the control arms are driven downwardly the segment member 90 will also be driven downwardly along with the gate member by virtue of its connection with the control arms 116 by the segment actuating pin 114. During downward movement of the gate and segment assembly and the control arms 116, the fixed guide pins 106 and 108 of the valve body will traverse the length of the elongate guide slot 122 and will maintain the control arms at the straight position shown particularly in FIG. 4, causing the gate and segment assembly to remain collapsed during its transit between the open and closed positions thereof. Thus, the control arms prevent the development of back-wedging because the segment is prevented from stopping and thus causing relative movement with the gate member as the gate is moved by the valve actuator.

At the upper ends of each of the control arms 116 the elongate guide slot 122 defines enlargements 128 which permit limited pivotal movement or canting of the control arms only when the gate and segment assembly has reached its closed position. At all other positions of the gate and segment assembly within the valve body, the control arms maintain the gate and segment assembly in its collapsed condition so that a condition of back-wedging will not occur. The guide slot enlargements 128 are formed by cutting away a side section of the elongate slot at the upper end of the slot. The guide slot enlargements 128 are of sufficient length to receive both of the guide pins 106 and 108 to thus permit limited pivoting or rotation of the control arms by the actuating pins 112 and 114 when linear movement of the segment is stopped and the gate member is permitted to move linearly relative to the segment and cause expansion of the gate and segment assembly. As this limited pivotal movement or canting of the control arms occurs, the guide pins will be disposed in registry with the upper guide slot enlargements 128 of each of the control arms and in registry with the elongate guide slots 122 of each of the control arms. As downward or closing movement of the gate and segment assembly continues, the lower end surface 100 of the segment will contact the stop surface 98, thus preventing further downward movement thereof. The gate member however will continue to move downwardly since the lower end 104 of the gate will enter the recess that is provided to receive it. This relative linear movement of the gate member 82 relative to the segment member 90 causes interaction of the cam surfaces 88 of the gate member and 94 of the segment member, resulting in expansion of the gate and segment assembly. This expansion movement causes the planar sealing surfaces 86 and 92 of the gate and segment members respectively to be forced laterally into tight sealing engagement with the sealing faces of the seat rings 72 and 74. As the gate member moves linearly relative to the segment member, the segment actuating pins 112 are moved downwardly while the segment and the segment control pins 114 are maintained static by the stop surface 98. This relative movement of the segment actuating pins 113 and 114 causes the control arms 116 to be pivoted counter clockwise about the segment actuating pins 114 as shown in FIG. 3, so that the elongate guide slot of each of the control arms is disposed in angulated relation with the guide pins 106 and 108 of the valve body. This pivotal movement of the control arms, which is permitted to occur only during expansion of the gate and segment assembly at the closed position thereof, causes the fixed guide pins of the valve body to be disposed within the offset enlargements of the guide slots as shown in FIG. 3.

It is important to note that, movement of the gate and segment assembly from the closed and expanded condition shown in FIG. 3 can only occur if the gate and segment assembly becomes collapsed. As upward movement of the gate is initiated the actuating pin 112 will be moved upwardly while the segment actuating pin 114 will tend to remain static due to frictional retention of the segment member against the valve seat 74. Upward movement of the actuating pin 112 by the gate member causes pivoting movement of the control arm about the actuating pin 114 and thus causes the elongate guide slot to be moved into alignment with the guide pins 106 and 108. Such movement of the control arm also causes the segment to be moved toward the gate member, causing the gate and segment assembly to become collapsed and readied for movement to the open position.

The control arms 116 may be formed from flat sheet metal stock if desired or may be composed of a polymer material that is suitable for the intended valve service. Although guide pins 106 and 108 are shown to be employed for guiding the control arms 116 during linear movement thereof, it should be borne in mind that any suitable guide structure, such as that shown in FIG. 5, for example, may be provided within the valve body for guiding the control arms. For example, elongate guide projections in the form of internal bosses may project inwardly from opposite sides of the valve body and may be received within the elongate guide slot 122 of each of the control arms. Alternatively, the valve body may be machined to define internal guide slots of appropriate configuration and the control arms may be provided with guide projections that traverse the elongate guide slots and permit pivotal control arm movement such as is described above.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A compact expanding gate valve, comprising:
    (a) a valve body having a valve chamber and inlet and outlet passages and having spaced internal seat rings, said valve body having at least one internal guide structure projecting into said valve chamber;
    (b) a gate member and a segment member defining a gate and segment assembly and being movable within said valve chamber to an open position permitting flow of fluid through said inlet and outlet passages and a closed position with said gate and segment assembly located between said seat rings and blocking the flow of fluid through said inlet and outlet passages, said gate member and said segment member each defining inclined cam surfaces disposed for engagement and causing lateral expansion of said gate and segment assembly responsive to relative linear movement of said gate member and said segment member;
    (c) a valve stem having driving connection with said gate member for moving said gate and segment assembly linearly to said open and closed positions; and
    (d) at least one actuator element having connection with said gate member and said segment member for linear movement therewith during opening and closing movement of said gate and segment assembly and having guided engagement with said internal guide element of said valve body, said actuator element maintaining said gate and segment assembly collapsed during movement thereof by said valve stem and permitting expansion thereof only at said closed position.

2. The compact expanding gate valve of claim 1, wherein: said actuator element defining an elongate guide slot having a substantially straight section receiving said internal guide structure movably therein and having an enlarged section receiving said internal guide structure and permitting rotational movement of said actuator arm responsive to linear movement of said gate element relative to said segment element during closing movement of said gate and segment assembly.

3. The compact expanding gate valve of claim 1, wherein said connection of said actuating element with said gate member and said segment member comprising:

(a) at least one actuating pin projecting from said gate element;

(b) at least one actuating pin projecting from said segment element; and (c) said actuator element having spaced actuating pin receptacles each receiving one of said actuating pins, upon relative linear movement of said gate element and said segment element said actuating pins applying rotational force to said actuator element.

4. The compact expanding gate valve of claim 1, comprising:

said actuator element being an actuator arm defining a pair of arm sections and defining an elongate slot between said arm sections, said elongate slot having a substantially straight section and having an enlarged section forming one end thereof, during closing movement of said gate and segment assembly said substantially straight section of said elongate guide slot preventing rotational movement of said actuator arm and during expansion of said gate and segment assembly by said interacting cam surfaces said enlarged section permitting rotational movement of said actuator arm by said actuating pins.

5. The compact expanding gate valve of claim 1, comprising:

(a) a segment stop member being located within said valve chamber and being positioned for stopping contact by said segment member; and (b) said segment stop member defining a gate recess permitting linear closing movement of said gate member relative to said segment member for causing said cam surfaces of said gate and segment members to laterally expand said gate and segment assembly and force said sealing surfaces of said gate member and segment member to tight sealing engagement with said seat rings.

6. The compact expanding gate valve of claim 1, comprising:

(a) said actuactor element being an actuator arm having first and second arm sections each having upper and lower ends, said upper and lower ends being interconnected, said first and second arm sections defining an elongate guide slot therebetween, said elongate guide slot receiving said internal guide structure of said valve body; and (b) said first arm section being connected with said gate member and said second arm section being connected with said segment member, causing substantially pivotal movement of said actuator arm responsive to relative linear movement of said gate member and said segment member.

7. The compact expanding gate valve of claim 6, comprising:

(a) said first and second arm sections each defining a connection receptacle; and (b) actuating pins projecting from said gate member and said segment member and being received respectively by said connection receptacles of said first and second arm sections, upon relative linear movement of said gate member and said segment member said actuating pins imparting substantially rotational force to said actuator arm; and (c) said substantially rotational force being resisted by said guide structure during a major portion of the linear movement of said gate and segment assembly and permitting substantially rotational movement of said control arm during relative linear movement of said gate member and said segment member as closing movement of said gate and segment assembly is completed.

8. The compact expanding gate valve of claim 1, comprising:

(a) actuating pins projecting from opposed sides of said gate member and said segment member;

(b) said at least one actuating element being a pair of actuator arms each being located at a respective side of said gate and segment assembly, said actuator arms each defining a pair of actuating receptacles each receiving an actuating pin such that relative linear movement of said gate and segment members imparts substantially rotational force of said actuating arms, said actuating arms each defining an elongate guide slot having a part thereof located between said pair of actuating receptacles and having an enlargement defining one end thereof, said elongate guide slots having guided engagement with said internal guide structure of said valve body and said enlargements permitting substantially rotational movement of said actuating arms only during final closing and initial opening movements of said gate member and said segment member.

9. A compact expanding gate valve, comprising:

(a) a valve body defining a valve chamber and having inlet and outlet passages, said valve body having spaced internal seat rings;

(b) guide structure being located at opposing sides of said valve body and projecting into said valve chamber;

(c) a gate and segment assembly having a gate member connected in driven relation with a valve stem and being movable by said valve stem between open and closed positions relative to said seat rings and flow passages, said gate member defining a planar sealing surface for sealing with one of said seat rings and defining an inclined cam surface and a segment member being movably disposed within said valve body and being movable between open and closed positions along with said gate member, said segment member having a planar sealing surface for sealing engagement with one of said seat rings and having an inclined cam surface for camming engagement with said inclined cam surface of said gate member for causing mechanical expansion and contraction of said gate and segment assembly responsive to relative linear movement of said gate and segment members;

(d) a pair of control arms located at opposite sides of said gate and segment assembly and having guided engagement with said guide structure of said valve body;

(e) actuating pins projecting from each side of said gate member and said segment member and each having substantially pivotal actuating connection with said guide arms, upon relative linear movement of said gate member and said segment member said actuating pins interacting with said pair of control arms and applying a controlling force to said gate member and segment member for collapsing or expansion of said gate and segment assembly.

10. The compact expanding gate valve of claim 9, wherein:

each of said control arms defining an elongate guide slot having a substantially straight section receiving said internal guide structure movably therein and having an enlarged section receiving said internal guide structure and permitting rotational movement of said actuator arm responsive to linear movement of said gate element relative to said segment element as closing movement of said gate and segment assembly is completed.

11. The compact expanding gate valve of claim 9, wherein said connection of said actuating arm with said gate member and said segment member comprising:
    (a) at least one actuating pin projecting from said gate element;
    (d) at least one actuating pin projecting from said segment element; and
    (e) said actuator arm having spaced actuating pin receptacles each receiving one of said actuating pins, upon relative linear movement of said gate element and said segment element said actuating pins applying rotational force to said actuator arm.

12. The compact expanding gate valve of claim 9, comprising:
    said actuator arm defining a pair of arm sections and defining an elongate slot between said arm sections, said elongate slot having a substantially straight section and having an enlarged section forming one end of said elongate slot, during closing movement of said gate and segment assembly said substantially straight section of said elongate guide slot preventing rotational movement of said actuator arm and during expansion of said gate and segment assembly by said interacting cam surfaces said enlarged section permitting rotational movement of said actuator arm by said actuating pins.

13. The compact expanding gate valve of claim 9, comprising:
    (a) a segment stop member being located within said valve chamber and being positioned for stopping contact by said segment member; and
    (b) said segment stop member defining a gate recess permitting linear closing movement of said gate member relative to said segment member for causing said cam surfaces of said gate and segment members to laterally expand said gate and segment assembly and force said sealing surfaces of said gate member and segment member to tight sealing engagement with said seat rings.

14. The compact expanding gate valve of claim 9, comprising:
    (a) said actuactor arm having first and second arm sections each having upper and lower ends, said upper and lower ends being interconnected, said first and second arm sections defining an elongate guide slot therebetween, said elongate guide slot receiving said internal guide structure of said valve body; and
    (b) said first arm section being connected with said gate member and said second arm section being connected with said segment member, causing substantially pivotal movement of said actuator arm responsive to relative linear movement of said gate member and said segment member.

15. The compact expanding gate valve of claim 14, comprising:
    (a) said first and second arm sections each defining a connection receptacle; and
    (b) actuating pins projecting from said gate member and said segment member and being received respectively by said connection receptacles of said first and second arm sections, upon relative linear movement of said gate member and said segment member said actuating pins imparting substantially rotational force to said actuator arm; and
    (c) said substantially rotational force being resisted by said guide structure during a major portion of the linear movement of said gate and segment assembly and permitting substantially rotational movement of said control arm during relative linear movement of said gate member and said segment member as closing movement of said gate and segment assembly is completed.

16. The compact expanding gate valve of claim 9, comprising:
    (a) actuating pins projecting from opposed sides of said gate member and said segment member;
    (b) said at least one actuating arm being a pair of actuator arms each being located at a respective side of said gate and segment assembly, said actuator arms each defining a pair of actuating receptacles each receiving an actuating pin such that relative linear movement of said gate and segment members imparts substantially rotational force of said actuating arms, said actuating arms each defining an elongate guide slot having a part thereof located between said pair of actuating receptacles and having an enlargement defining one end thereof, said elongate guide slots having guided engagement with said internal guide structure of said valve body and said enlargements permitting substantially rotational movement of said actuating arms only during final closing and initial opening movements of said gate member and said segment member.

17. A compact expanding gate valve, comprising:
    (a) a valve body having a valve chamber and inlet and outlet passages and having spaced internal seat rings, said valve body having at least one internal guide structure projecting into said valve chamber;
    (b) a gate member and a segment member defining a gate and segment assembly and being movable within said valve chamber to an open position permitting flow of fluid through said inlet and outlet passages and a closed position with said gate and segment assembly located between said seat rings and blocking the flow of fluid through said inlet and outlet passages, said gate member and said segment member each defining inclined cam surfaces disposed for engagement and causing lateral expansion of said gate and segment assembly responsive to relative linear movement thereof;
    (c) a valve stem having driving connection with said gate member for moving said gate and segment assembly linearly to said open and closed positions; and
    (d) at least one control element having substantially pivotal connection with said gate member and said segment member and defining guide structure having guided engagement with said internal guide element, said control element maintaining said gate and segment assembly collapsed during movement thereof by said valve stem and permitting cam actuated expansion thereof only with said gate and segment members at said closed position.

18. The compact expanding gate valve of claim 17, comprising:
    said guide structure having a geometry permitting relative linear movement of said gate member and said segment member in a direction for expansion of said gate and segment assembly only with said gate and segment assembly at said closed position.

* * * * *